Figure 2:
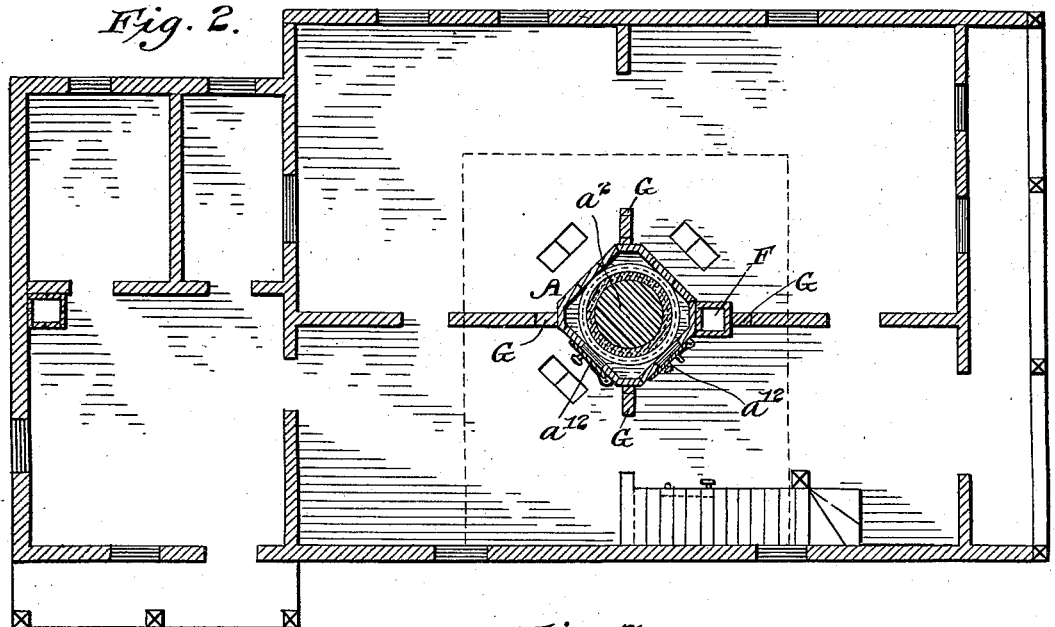

(No Model.)  4 Sheets—Sheet 1.
F. W. G. BOETTCHER.
COMBINED HEATING AND COOKING STOVE, &c.
No. 578,622.  Patented Mar. 9, 1897.
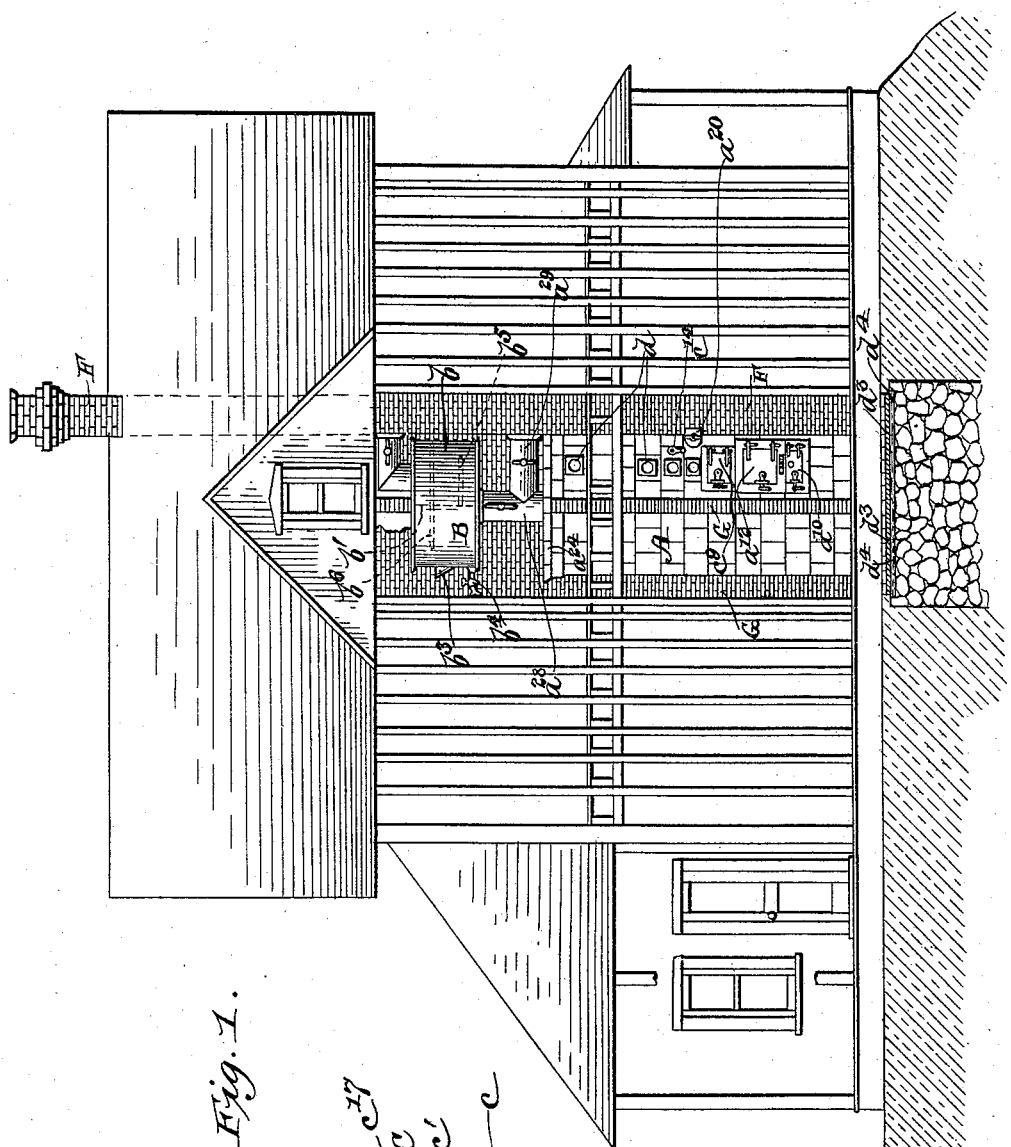
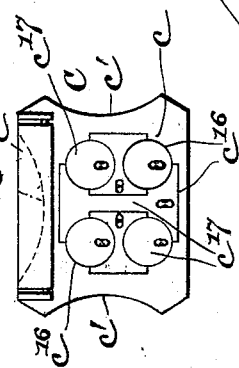
Fig. 1.
Fig. 18.
WITNESSES
INVENTOR (No Model.)  4 Sheets—Sheet 2.

F. W. G. BOETTCHER.
COMBINED HEATING AND COOKING STOVE, &c.

No. 578,622. Patented Mar. 9, 1897.

WITNESSES

INVENTOR (No Model.)
4 Sheets—Sheet 3.
F. W. G. BOETTCHER.
COMBINED HEATING AND COOKING STOVE, &c.
No. 578,622. Patented Mar. 9, 1897.
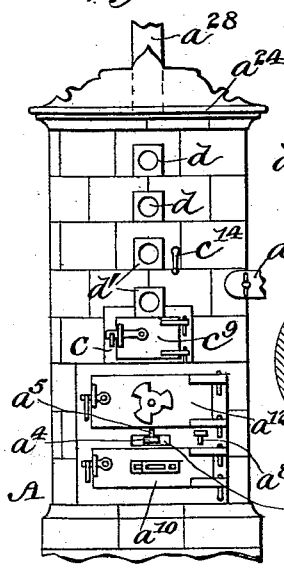
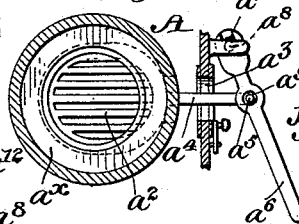
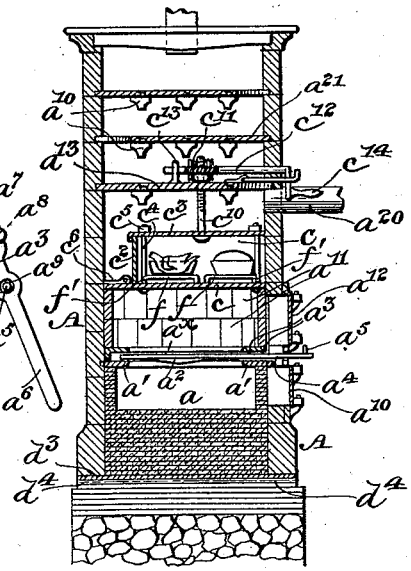
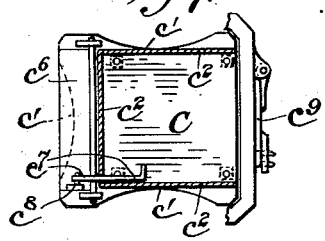
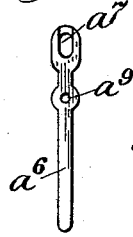
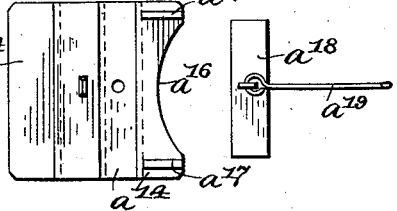
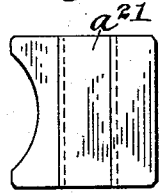
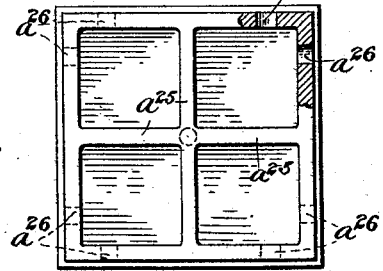
WITNESSES
INVENTOR

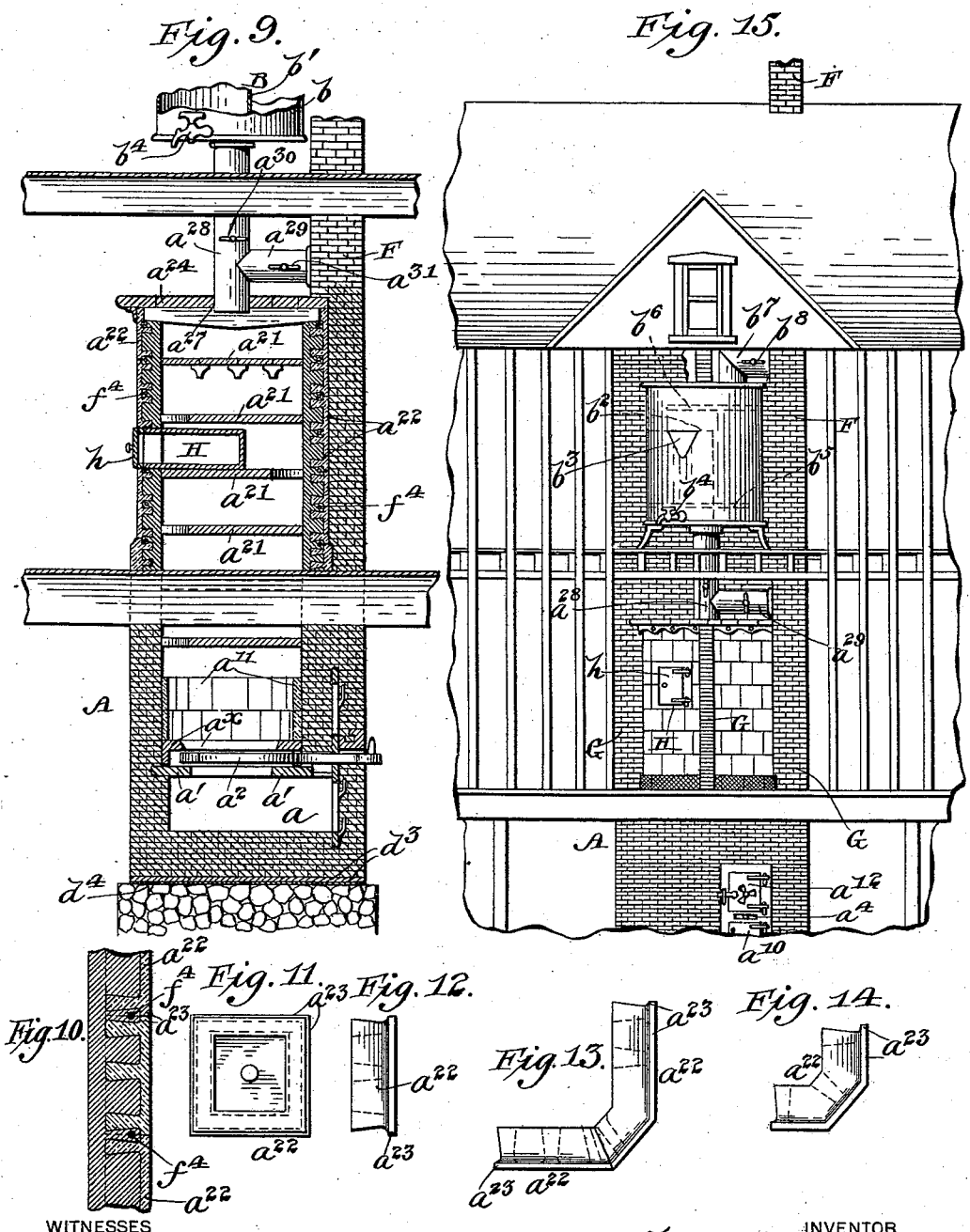

UNITED STATES PATENT OFFICE.

FRIEDRICH W. G. BOETTCHER, OF DULUTH, MINNESOTA.

COMBINED HEATING AND COOKING STOVE, &c.

SPECIFICATION forming part of Letters Patent No. 578,622, dated March 9, 1897.

Application filed February 14, 1896. Serial No. 579,207. (No model.)

*To all whom it may concern:*

Be it known that I, FRIEDRICH W. G. BOETTCHER, a citizen of the United States, residing at Duluth, in the county of St. Louis and State of Minnesota, have invented certain new and useful Improvements in Combined Heating and Cooking Stoves and Systems; and I do hereby declare the following to be a full, clear, and exact description of the invention, such as will enable others skilled in the art to which it appertains to make and use the same.

My invention relates to improvements in combined cooking and heating stoves and systems for houses.

My invention consists, first, in a novel construction and arrangement, with two or more groups of compartments situated one above the other in a dwelling-house, of a stove or like heating structure extending from one group of compartments to another, said stove or heating structure having substantially uniform dimension from its top to its bottom and provided with suitable controlling-dampers and means for retarding the flow of the products through the heater between one story and another, and means for carrying away the products of combustion, all as will be hereinafter described and claimed.

It consists, second, in a combined heater and cooking-stove comprising a fire-box and oven adjustably mounted above the same and closing the cross-section of the heater, but provided with suitable recesses for the upward passage of heat about the same, a damper for closing the rear recess, so as to cut off the heat from that part and prevent it passing up in the rear of the oven.

My heater or combined heater and cooking-stove will be found especially useful in wooden buildings, and it is so organized and applied in the building that a group of rooms on one floor of a dwelling-house can have heat radiated into them simultaneously without endangering the contiguous parts of the building, and at the same time a group of rooms of a story above will in like manner have heat radiated into them with equal benefit and safety; and the stove in appearance will resemble a many-sided column extending up with substantially uniform dimension through the center of the building, and its exterior surface, preferably enameled tiling, will give an artistic finish to the room; and withal every facility for cleaning out the division-chambers of the stove or heater between the lower and upper compartments of the building will be afforded by manholes in the sides of the furnace and passages in the bottom plates of the division-chambers. Facilities for heating water in the different compartments by having the products of combustion pass through flues constructed in the bottoms and walls of the water-heating vessels will be afforded, and controlling and regulation dampers will be provided, as will appear from the following specification.

Figure 3:
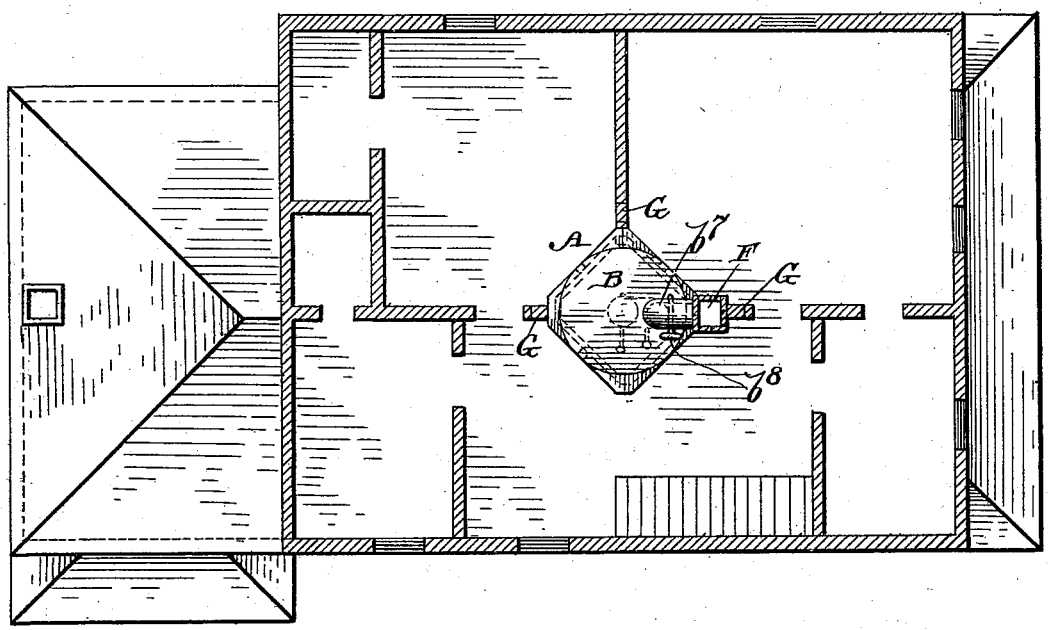

In the accompanying drawings, forming part of this specification, Figure 1 represents a side elevation of a house without a basement, the walls being broken away to exhibit my invention built therein. Fig. 2 represents a horizontal section through the lower story of said house. Fig. 3 represents a horizontal section through the upper story of the said house. Fig. 4 represents an enlarged detail front elevation of my combined heater and cooker. Fig. 4ª represents respectively a detail vertical section and side elevation of one of the manhole-casings for the heater and a side elevation of the plug for closing the same. Fig. 5 represents a central vertical section through the heater and cooker. Fig. 6 represents a transverse section of said heater, taken just above the grate and showing the devices for shaking the latter. Fig. 6ª represents a detail plan view of the shaking-lever. Fig. 7 represents a detail top plan view of the oven proper. Fig. 8 represents a detail top plan view of one of the baffle-partitions of the heater with its damper. Fig. 8ª represents a detail top plan view of one of the baffle-partitions of the heater. Fig. 9 represents a central vertical section through my improved heater and water-drum, the latter being broken away, showing the invention applied to a basement-house and the cooking portion of the apparatus omitted. Fig. 10 represents an enlarged detail vertical section through a portion of the wall of one of the heaters. Fig. 11 represents a rear elevation of one of the squares of which the walls of the heater are composed. Fig. 12 represents a side elevation of the same. Figs. 13 and 14 represent, respectively, different forms of corner blocks or tiles for the walls of the heater. Fig. 15 represents a side elevation of a house with a basement, showing my invention built therein. Fig. 16 represents a transverse section through one of the water-heating drums. Fig. 17 represents a bottom plan view of a modified form of tile, and Fig. 18 represents a top plan view of the floor of my improved oven.

A in the drawings represents the heater proper, B the heating water-drums for the upper floors, and C the cooking-oven.

The heater or stove A comprises an ash-pit $a$, surmounted by a supporting-ring $a'$, on which the grate $a^2$ is loosely mounted. A ring $a^\times$ is mounted above the grate and provided with an annular flange slotted at $a^3$ to permit the passage of an operating-arm $a^4$ of the grate $a^2$. The outer end of the arm is provided with an upwardly-projecting stud $a^5$ and projects through a suitable slot in the metallic door-casing, whereby it can be engaged by an operating-lever $a^6$. This lever is provided with an end aperture $a^7$, adapted to engage a pendent pin $a^8$ on the stove-door casing, and a similar aperture $a^9$, adapted to engage the stud $a^5$ and the end of the arm $a^4$. The pin $a^8$ is the fulcrum on which the lever is oscillated, and the movement of said lever pushes the grate both back and forth and from side to side and results in a very effective shaking of the same. A suitable door $a^{10}$ covers the opening into the ash-pit. The fire-box above the grate is lined with fire-brick $a^{11}$, and a suitable door $a^{12}$ covers the doorway in said box for the insertion of fuel.

I preferably provide my heater with a bake-oven C, as shown in Fig. 5, but it is sometimes desirable to omit the same, as shown in Figs. 9 and 15. This oven comprises a bottom plate $c$, hollowed out on three sides, as at $c'$ $c'$ $c'$, so that when suspended above the fire it will completely fill the cross-section of the heater except at said points $c'$ $c'$ $c'$, where openings will remain for the escape of the heat and products of combustion upward about three sides of the oven. This bottom plate $c$ is provided with apertures $c^{16}$ $c^{16}$, that are ordinarily closed by removable covers $c^{17}$ $c^{17}$. These covers when removed leave apertures over which pans or kettles may be placed and thus receive the heat directly from the fire. The vertical walls $c^2$ of the oven are held in position by the overlapping edges of the top $c^3$, which is bolted down firmly upon them by bolts $c^4$, which pass through said bottom plate $c$ and the top and are secured by nuts $c^5$. The rear opening $c'$ of the bottom plate is covered by a hinged damper $c^6$, which is operated to open or close it by a slide $c^7$, mounted on one of the vertical walls of the oven and connected thereto by engaging a pin $c^8$, suitably mounted on said damper. It will thus be seen that the heat, smoke, &c., may be made to pass through the side openings $c'$ alone or allowed to pass up through both side and rear openings. This is sometimes very desirable when the oven gets too hot at the back, as the danger of burning one side of the food being cooked while the other is yet undone is thus obviated.

A suitable door $c^9$ is provided in the wall of the heater, so that articles of food may be put into or taken from the oven. The oven is provided with plates $ff$ for supporting the pans containing the food away from the bottom of the oven. These plates are turned downward along their longitudinal edges to form supporting-flanges $f'$ $f'$. The oven is supported by a screw-bolt $c^{10}$, which passes through its top and also through a partition $a$, which will be hereinafter more fully described. A worm-wheel $c^{11}$ is mounted on said screw so as to screw up and down on the same when rotated and rests upon the top of the partition $a^{13}$. This worm-wheel is rotated by a worm-shaft $c^{12}$, which is suitably journaled in journal-boxes $c^{13}$ on the partition and passes through the front wall of the heater. This outwardly-extended end of the shaft is provided with a crank $c^{14}$, by which said shaft is rotated, to rotate the wheel $c^{11}$ and thus raise and lower the bolt $c^{10}$ and the oven carried thereby. It will be observed that by the above-described means the oven can be raised or lowered at will, so as to increase or diminish the heat therein, according to its distance from the fire in the fire-box.

The partition $a^{13}$ is made up of a series of plates $a^{14}$, as shown in Fig. 8. These plates overlap each other, but are cut away at said overlapping edges, so as to fit snugly together and form one smooth horizontal partition. Suitable cross-bars $a^{15}$ have their ends set in the side walls of the heater and support said partition. The forward plate in said partition is cut away, as at $a^{16}$, and is provided upon its upper surface with two ledges $a^{17}$, that form guides for a sliding damper $a^{18}$. This damper is operated, either to cover or uncover the opening $a^{16}$, by a rod $a^{19}$, that is suitably attached thereto and projects through the front wall of the heater. An outlet $a^{20}$ is formed in the wall of the heater below said partition $a^{13}$ and is suitably connected to the chimney F, so that when the damper $a^{18}$ is closed the smoke, heat, &c., will pass about the oven and then up the chimney and will thereby not heat the upper rooms in the house, as is of course necessary in the summer.

Partitions $a^{21}$ similar to partition $a^{13}$ divide the upper part of the heater into a number of horizontal communicating compartments, the openings in the partitions being situated first at the back and then at the front of the heater, so that the heat, &c., will be forced to pass in a circuitous passage through the heater and will thus be more effective than if it passed straight up through the same. The walls of the heater are formed of tiles or enameled brick backed with fire-clay.

I preferably use tile or brick of the shape shown in Figs. 10, 11, and 12. This comprises a hollow rectangular tile $a^{22}$, tapering outward and provided with an overhanging flange $a^{23}$ about its outer edges, so that said tiles will come smoothly together at their meeting edges. The walls of the tiles are also tapered internally, so that when the fire-clay is applied therein the tiles cannot be pulled away from the same after it has set. Each tile is also provided with a central internal tapered web, which also assists in keeping the tile in position when the fire or other clay is set.

The modified form of tile shown in Fig. 17 is provided with two diametrically-arranged partitions or webs $a^{25}$, said webs tapering inwardly in thickness, so as to form a lock for the clay that is inserted around them. The side walls of said tiles are also provided with apertures $a^{26}$, through which the clay passes, and thus forms an additional lock for holding said tiles in place.

In Figs. 13 and 14 are shown the preferred form of corner tiles. These are substantially the same as the side tiles, being provided with overhanging flanges and tapered walls and studs. Wires $f^4$ are inserted in the fire-clay as the heater is built up, so as to firmly bind the whole together when the clay is set.

The top of the heater is capped with a suitable ornamental cover $a^{24}$. This cover is provided with a passage $a^{25}$ for the exit of the products of combustion into a pipe $a^{26}$, that communicates with the drum B above. This pipe also communicates with the chimney F by a branch pipe $a^{27}$. The pipes $a^{26}$ and $a^{27}$ are provided with suitable dampers $a^{28}$ and $a^{29}$, respectively, by means of which the products of combustion can be either turned into the chimney after passing through the heater proper or be permitted to ascend into the drum B.

It becomes necessary at times to clean the heater, as soot and dust collect upon the horizontal partitions. To facilitate this cleaning, I provide the front wall of the heater with manholes or thimbles $d\ d$. These thimbles are each provided with end flanges $d'\ d'$, whereby they are secured firmly in the wall of the heater. The apertures in the thimbles are closed by plugs $d^2\ d^2$ of any suitable construction. One manhole is provided for each chamber formed by said partitions. In cleaning, the operator stands at the top chamber and pulls the soot and dust forward, so that it will drop through the opening in said partition onto the next succeeding partition. It is then pushed back through the opening in said latter partition and drops onto the next lower partition. This operation is repeated until the soot drops upon the top of the oven. It is then brushed from the top of the oven either at the sides or the back and falls into the fire-box and from thence to the ash-pit.

The heater is supported on a layer of wood $d^3$, and beneath the same a layer of paper $d^4$. The object of the latter is to prevent the passage of heat downward. The ash-pit is surrounded by any suitable masonry. The pipe $a^{26}$, as before stated, communicates with the drum B, which is arranged on the upper floor.

This drum comprises a metallic cylinder or drum $b$, having a vertical diametrically-arranged partition $b'$. This partition extends only a part of the height of the said drum. The portion of the drum inclosed by said partition is covered by a plate $b^2$ and forms a water receptacle or chamber. The water is then introduced into this chamber through an opening in the side of the drum, a lip $b^3$ being applied on said drum so as to direct the water into said opening. The heated water is drawn off by a cock $b^4$. The interior of the drum is provided with two horizontal partitions $b^5$ and $b^6$, whereby the products of combustion passing through said drum are made to travel in a circuitous route, so as to thoroughly heat both the drum proper and the water in the water-chamber. A pipe $b^7$ connects the upper end of the drum with the chimney. This pipe is provided with a damper $b^8$ for preventing the products of combustion from entering the drum from the chimney when the lower dampers are closed and the smoke, &c., are not passing through the drum.

It will be seen from the aforegoing that there will always be hot water on the upper floors shortly after the fire is started. By reference to Figs. 2 and 3 the arrangement of my heating system will be readily understood. Both the heaters and the heating-drums are arranged at the junction of the walls of several rooms, so that a portion of the heater or drum will be exposed in each room.

The above description has more particular relation to the form of my invention shown in Fig. 1, in which it is illustrated in connection with a two-story dwelling without basement. The openings into the heater will come in the kitchen on the first floor. The heater extends upward, so that its top projects slightly above the second floor and the drum is supported at some distance above the floor.

In the construction shown in Figs. 9 and 15 the oven is omitted and the heater is provided with a warming-compartment H, closed by a suitable door $h$. In this construction the furnace proper is in the cellar or basement, while the upper portion or heater proper projects above the first floor. The heater does not pass through the second floor, but ends just below the same. The drum B is also enlarged and supported on legs $b^{10}$. The warming-compartment H is intended to receive meals and keep them warm without unduly drying them.

It will be observed from the aforegoing description that my apparatus will heat the whole house and at the same time afford means for cooking, when so desired. It also furnishes hot water in the upper stories, which of course is very desirable. It will also be observed that when it becomes necessary, as in the summer, for instance, the heat can be used for cooking only and then turned into the chimney, and will thus not heat the upper part of the house at all. The heat can also be passed through the heaters and then into the chimney by my peculiar system of dampers, and thus only heat the first floor or the basement and the first floor.

It is not necessary that the house should be constructed as shown in the drawings, as different drums can be provided and connected by suitable flues, so as to heat respectively one or more rooms. The tiles or enameled brick of which the heater is constructed may be of any suitable color, design, or configuration.

Brick partitions G are built at each corner of the heater to connect the same with the partitions of the house, and any danger of fire is thus avoided.

Having now described my invention, what I claim as new, and desire to secure by Letters Patent, is—

1. The combination with two or more groups of compartments situated one group above another, of a heater extending from one group to the other, and having substantially uniform dimension from its top to its bottom, means for retarding the flow of products through the heater, and means for carrying away the products of combustion, substantially as described.

2. A combined heater and cooking-stove comprising a fire-box, an oven adjustably mounted above the same and closing the cross-section of the heater but provided with suitable recesses for the upward passage of heat about the same, and a damper for closing the rear recess so as to cut off the heat from that part of the oven, substantially as described.

In testimony whereof I hereunto affix my signature in presence of two witnesses.

FRIEDRICH W. G. BOETTCHER.

Witnesses:
E. T. FENWICK,
LUTHER L. APPLE.